United States Patent [19]

Sundström

[11] Patent Number: 4,833,760
[45] Date of Patent: May 30, 1989

[54] DEVICE FOR DETACHABLE AND REPEATABLE CLAMPING OF TWO OBJECTS TO EACH OTHER

[75] Inventor: Erik Sundström, Spånga, Sweden

[73] Assignee: Ideab, Sweden

[21] Appl. No.: 193,426

[22] Filed: May 12, 1988

[30] Foreign Application Priority Data

May 12, 1987 [SE] Sweden .............. 8701886-7

[51] Int. Cl.⁴ .............................. A44B 1/04
[52] U.S. Cl. .............. 24/609; 24/603; 403/31; 403/322; 411/342; 411/344
[58] Field of Search .......... 24/609, 287, 594, 597, 24/603, 608, 610, 611, 628; 403/31, 322; 411/342, 341, 344, 340

[56] References Cited

U.S. PATENT DOCUMENTS

| | | |
|---|---|---|
| 2,458,015 | 1/1949 | McDonald . |
| 2,490,636 | 12/1949 | Klein . |
| 2,658,221 | 11/1953 | Nicoli . |
| 2,723,412 | 11/1955 | Harris . |
| 3,300,171 | 1/1967 | Watts ............ 24/608 X |
| 3,311,188 | 3/1967 | Gutshall ............ 24/603 X |
| 4,434,520 | 3/1984 | Caniglia . |
| 4,546,517 | 10/1985 | Caniglia . |
| 4,549,846 | 10/1985 | Torii et al. ............ 24/603 X |
| 4,759,686 | 7/1988 | Kirst ............ 24/603 X |

FOREIGN PATENT DOCUMENTS 2814902 10/1979 Fed. Rep. of Germany .
812989 3/1981 U.S.S.R. .............. 403/31

Primary Examiner—Kenneth J. Dorner
Assistant Examiner—Laurie K. Cranmer
Attorney, Agent, or Firm—Kirkpatrick & Lockhart

[57] ABSTRACT

A device for detachable and repeatable accurate clamping in X-, Y- and Z-directions of a first object to a second object like a working table (2) to a machine table (1), the first object (1) having a house (3) with a truncated conical surface (15) intended to cooperate with a corresponding conical surface (25) of the second object (2) and clamping member (9), each intended when clamping the second object to the first object by pivoting the clamping member to engage a clamping surface (20) of the second object by a nose (12). According to the invention the house (3) is provided with a first stop face (17) extending across the axis (16) of the truncated conical surface (15) and cooperating with a second stop face (21) arranged in the second object, the mutual position in the Z-direction of the first and second objects being unambiguously determined. The clamping member (9) further have a neck (13) arranged in connection to the nose (12) and which during the engagement of the nose with the clamping surface (20) of the second object rests against a portion (6) being an integral part of the house (3) and fixed therewith thereby preventing pivoting of the clamping member (9).

14 Claims, 2 Drawing Sheets

DEVICE FOR DETACHABLE AND REPEATABLE CLAMPING OF TWO OBJECTS TO EACH OTHER

BACKGROUND OF THE INVENTION

1. Field of the Invention

This invention relates to a device for the detachable and repeatable accurate clamping in X-, Y- and Z-directions of a first object to a second object. As further examples of the objects being able to be clamped to a machine table are e.g. working tables, fixtures, pallets, tools or similar things.

2. Description of the Invention Background

A plurality of different types of such clamping devices are known and have a plurality of such drawbacks connected with a great number of parts with an exposed position, exposed to pollution and to risks of damages which influences the clamping accuracy and the function security.

In the Swedish patent specification 8302028-8 there is described a device intended to eliminate the drawbacks and solve the problems existing in the previous clamping technique. This later clamping deice has a clamping means with an enlarged head and tightening means which in the clamping position engages the enlarged head of the clamping means and a clamping mechanism operating the tightening means into engagement and out of engagement with the head of the clamping means. This device allows a relatively compact housing, but is limited regarding load in the clamping direction and is sensitive to temperature differences between the two clamped objects. The clamping means in the form of a bolt screwed into the one object, e.g. a pallet, thus means that the height of the pallet depends on the material that is required for taking up the clamping means or the bolt when having the intended load. By this construction there arises large tensile concentrations in the material of the pallet in this area. In order that the tightening means shall not lose their grip of the enlarged head of the clamping means, the heels of the tightening means as well as the contact surface of the head are designed with negative angles or undercuts.

Thus, also this developed form of clamping device has a such drawbacks which cannot be regarded as acceptable for a great repeating accuracy when clamping, as has been mentioned, fixtures, pallets, tools or similar to a working table.

SUMMARY OF THE INVENTION

By this invention, the clamping means in the form of the set bolt is eliminated, allowing that the fixture, pallet or similar can be reduced in height and accordingly be made lighter. By the invention an exact, repeatable clamping position is achieved in all directions, i.e. also in the Z-direction.

BRIEF DESCRIPTION OF DRAWINGS

The invention will be more closely described in the form of an example with reference to the drawing, in which.

DETAILED DESCRIPTION OF THE PREFERRED EMBODIMENTS

Figure 1:
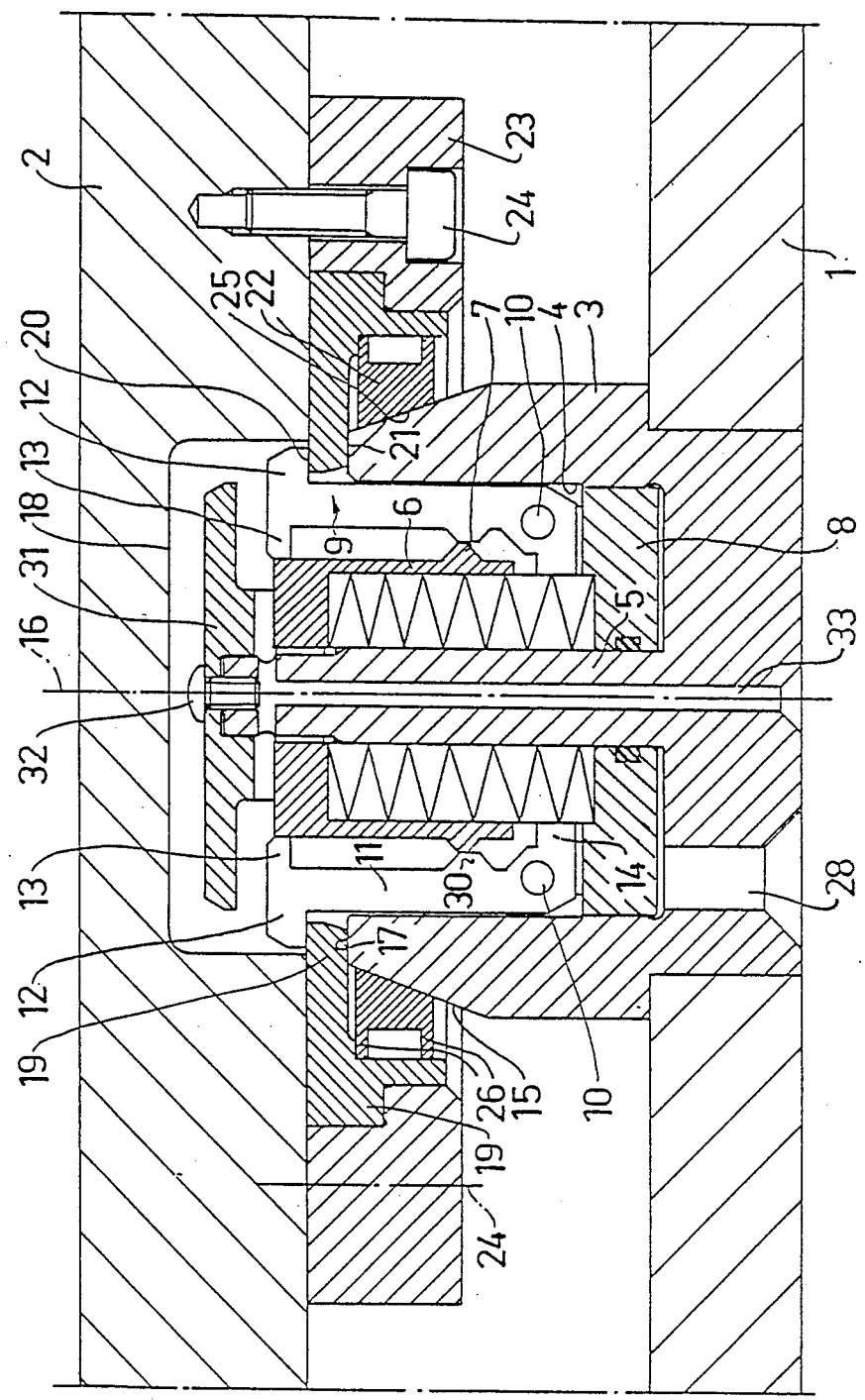
FIG. 1 shows the device according to the invention in section with a fixture or similar clamped to a machine table.

In the FIGS. 1 denotes a machine table and a working table or a fixture. The machine table 1 has a cylindrical housing or house 3 fastened to it, having a central bore 4. Centrally in the bore there extends a dowel 5, fixed with the house, and at its free end there is threaded a cylindrical portion 6. The cylindrical portion 6 has a peripheral projection in the form of a cam surface 7. In the bore 4 there is a plunger 8 axially movable and tightened against the walls of the bore as well as against the dowel 5. In a suitable way, e.g. by means of upwards directed springs or ears arranged a the upper side of the plunger according to the figures, there are arranged a number, e.g. four, evenly distributed tightening means 9 pivotably journalled at the plunger by means of bearing shafts 10. Respective tightening means 9 comprises a shaft 11, the end of which positioned remote from the bearing shaft 10 has a nose 12 and a neck 13. At that part of the tightening means 9 positioned at the opposite end of the bearing shaft 10 is the tightening means provided with a projection 14.

The house 3 further has a truncated conical surface 15 at its upper periphery and a stop face 17 extending across the axis of the conical surface (as well as the axis 16 of the bore 4, the dowel 5 and the cylindrical portion 6).

The working table or the fixture 2 has in the shown example a recess 18 at the edge of which there is arranged an annular shoulder 19, which has an upper clamping surface 20 turned towards the inner part of the recess 18 and an outer stop face 21 turned downwards in the figures. In connection to the annular shoulder there is a ring 22 fastened to the flange portion 19″ of the shoulder. The annular shoulder 19, 19′ is fastened to the working table 2 by means of a locking ring 23 which is fastened to the working table by means of bolts 24. The ring 22 has its inner side designed like a conical surface 25 intended to cooperate with the conical surface 15 of the house 3. The ring 22 is at its outer edge designed with two peripheral, radially directed springs 26, which clamp and carry the ring 22 in the part 19, 19′. Due to the design of these springs 26 the ring 22 and by that the conical surface 25 have a possibility to spring in the Z-direction, i.e. the clamping direction parallel to the previously mentioned axis 16.

Figure 2:
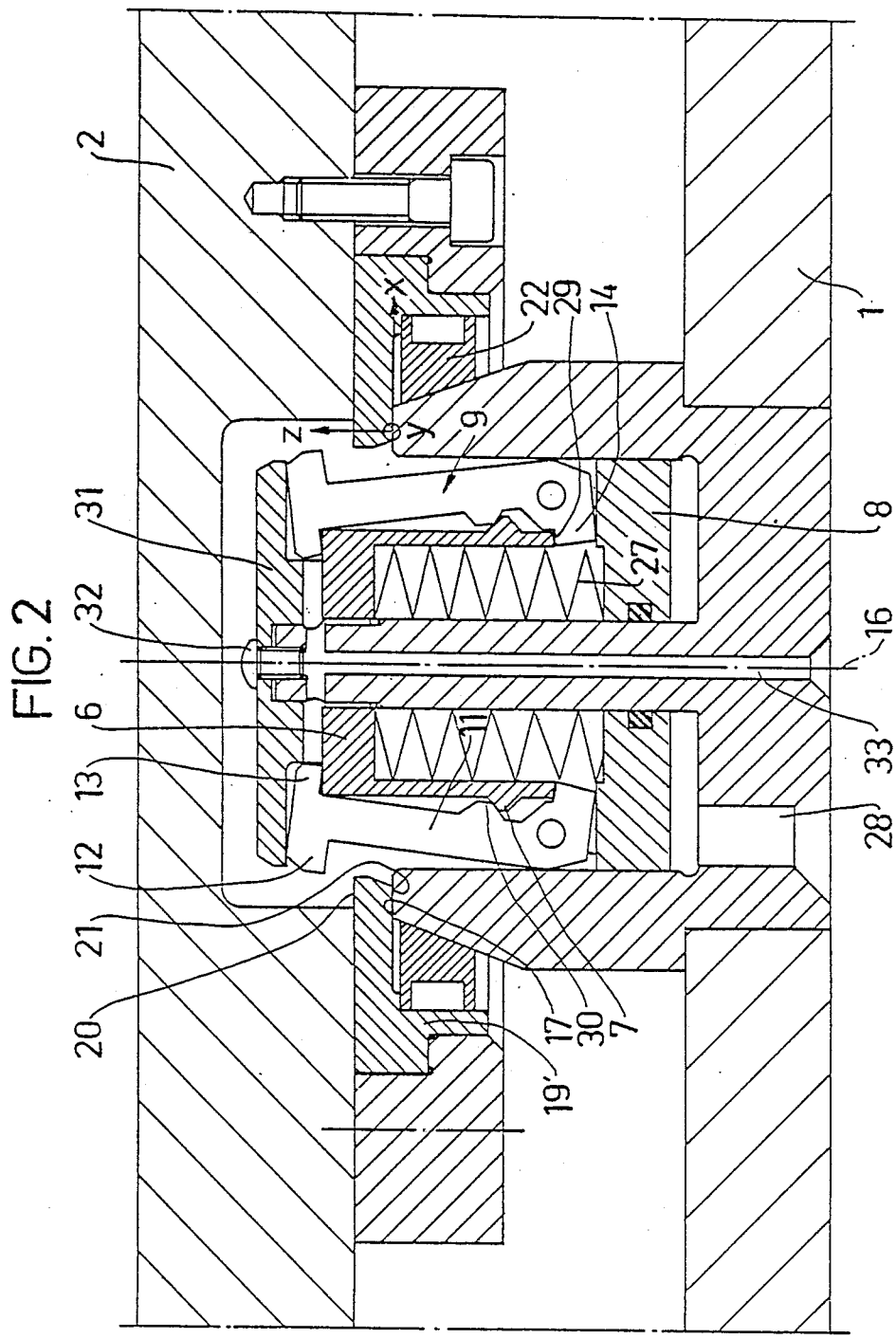
FIG. 2 shows the corresponding section, but with the tightening means in neutral position.

As is shown in FIG. 2 the plunger 8 has been displaced upwards in the cylindrical bore 4 against the action of a compression spring 27, the one end of which rests against the bottom of the cylindrical portion 6 and the other end of which against the upper side of the plunger 8. The displacement against the action of the compression spring 27 is made by means of a hydraulic fluid supplied through a bore or a pipe connection 28. At the same time as the plunger 8 is moved upwards also the tightening means 9 are moved together with the plunger, the projection 14 of respective tightening means 9 will jar against the lower free edge 29 of the cylindrical portion 6 at the uppermost position of the plunger 8. Due to the cooperation between the projection 14 and the edge 29 respective tightening means 9 will be pivoted inwards as is shown in FIG. 2. Due to that fact the noses 12 go free from the shoulder 19 and its clamping surface 20. In this position the working table or the fixture 2 can be applied onto the machine table 1 by the clamping device in that way that the stop face 21 of the fixture will rest on the stop face 17 of the house 3, whereby the position of the fixture 2 in the Z-direction is exactly defined. The aimed contact between the stop faces 17 and 21 is always secured because of the possibility of resilience of the ring 22 when the conical surface 15 of the house 3 engages the conical surface 25 of the fixture 2. The conical surfaces 15 and 25 secure the fastening of the fixture 2 to the machine table 1 in X- and Y-directions (FIG. 2).

The pressure in the pipe 28 is thereafter reduced, the compression spring 27 forcing the plunger 8 downwards. That means that a cam 30 arranged on respective tightening means 9 engages the cam surfaces 7 of the portion 6 which clearly appears from the figures, whereby the tightening means 9 are pivoted outwards. In that connection should be understood that the projections 14 of the tightening means 9 go free from the lower edge of the portion 6 because of the lowering of the plunge 8, which makes the mentioned pivoting outwards of the tightening means possible. The continuous movement downwards of the plunger 8 has the consequence that the tightening means 9 are entirely pivoted outwards when the cam 30 slide up upon the cam surface 7 and that the neck 13 of respective tightening means will rest against the portion 6 with its end surface (FIG. 1).

The continuous movement of the plunger 8 means that the noses 12 will clamp against the clamping surface 20 because of the spring force of the compression spring 27 and in so doing will effectively lock the fixture to the machine table 1 in a well-defined position in X-, Y- and Z-direction. Due to the fact that the tightening means on a level with the noses 12 directly via the necks 13 rest against the portion 6, an optimum locking of the tightening means in the clamping position is achieved.

Above the house 3 and extending over the tightening means there is arranged a circular protection cover 31 e.g. fastened to the dowel 5 by means of a bolt 32. This protection cover 31 mechanically protects the device against damages as well as also to a certain extent from being polluted. In a known way can also e.g. compressed air or a clean liquid via a channel 33 in the dowel 5 be blown through the device and out in connection to the noses and necks of the tightening means 9 with the result that these areas will be effectively blown clean. When having a mounted device a predetermined pressure can be applied into the area which is tightened off by the house 3, plunger 8 and fixture 2 which pressure can be controlled by a pressure switch in order to indicate possible pressure reduction nd by that leakage which in its turn indicates that the clamping is not correct and that there could be possible pollutions between the surfaces determining X-, Y- and Z-directions.

Above an example has been described how the movement of the tightening means 9 is guided by a cam surface 7 with a cooperation cam 30 and by projections 14 with a cooperating free edge 29 in the plunger 8. Of course it should be understood that the movement of the tightening means in one of the directions can be brought about by means of the spring force from springs applied in a suitable way. Instead of mounting the tightening means 9 directly articulated on a shaft, as has been described above and been indicated in the drawings, respective fastening means can be fastened to the plunger 8 by means of e.g. a leaf-spring which is suitably mounted axially in relation to the plunger 8 in order to prevent axial movement of the tightening means.

An example of the invention has been described and it should be self-evident for those skilled in the art that within the scope of the invention it is possible to vary the different details regarding the form and the construction as well as the mounting. A has been mentioned e.g. four tightening means 9 can be used, but of course three or more than four are possible to use, evenly distributed around the plunger. The conical surface weak in Z-direction and defined by the ring 22 can further be arranged in the house 3 instead of the ring 19, 19' (the fixture). Likewise is in the figure shown only one bolt 24 for fastening the locking ring 23 to the fixture 2, but it should be understood that a number of such bolts can be used. Neither is the control system for the pressure fluid or the compressed air shown. The use of the device according to the invention is of course many-sided and the intention is to achieve an accurate, repeatable clamping of two objects to each other and normally several devices are arranged at respective object, e.g. the mentioned machine table.

What is claimed is:

1. Apparatus for detachable and repeatable accurate clamping in X-, Y- and Z-directions of a first object (1) to a second object (2), the first object (1) having a house (3) with at truncated conical outer surface (15) intended to cooperate with a corresponding conical inner surface (25) of the second object (2), and a plurality of pivotable tightening means (9) on the first object, each intended when clamping the second object to the first object by pivoting the tightening means to engage a clamping surface (20) of the second object by a nose (12) on each of said clamping means, comprising a first stop face (17) extending perpendicular to the central axis (16) of the truncated conical surface (15), cooperating with a second stop face (21) arranged in the second object, to determine the mutual position in the Z-direction of the first and second objects, and each of the respective tightening means (9) having a neck (13) arranged in connection to its nose (12) such that, during the engagement between each nose and the clamping surface (20) of the second object, each neck rests against a portion (6) being an integral part of the house and fixed therewith, thereby preventing pivoting of the tightening means (9).

2. Apparatus according to claim 1, in which the corresponding conical surface (25) of the second object is non-rigid in the Z-direction.

3. Apparatus according to claim 2, in which the house (3) carries a plunger (8) movable in the Z-direction and each of the respective tightening means (9) has a shaft (11) extending from the nose (12) and the neck (13), each said shaft at its end being pivotably journalled to the plunger (8) around a corresponding pivoting axis (10).

4. Apparatus according to claim 3, in which each shaft adjacent to its corresponding pivoting axis (10) is provided with a cam (30) and the house (3) has a cam surface (7) with which the cam (30) cooperates in that way that when the plunger (8) and the respective tightening means (9) are moved in one direction in relation to the house (3), each of the tightening means (9) pivots because of the cooperation of the cam (30) and the cam surface (7) and forces its nose (12) to engagement with the clamping surface (20).

5. Apparatus according to claim 4, in which each shaft (11) at the other end of the corresponding pivoting axis (10) in relation to the nose (12) and the neck (13) has a projection (14) which, when the plunger (8) and by that the respective tightening means (9) are moved in the other direction in relation to the house (3), engages an extension portion (29) of the house and forces each of the tightening means (9) to pivot the nose (12) out of engagement with the clamping surface (20).

6. Apparatus according to claim 5, in which the plunger (8) is movable in the other direction against the action of a spring means (27).

7. Apparatus according to claim 6 in which the house (3) has a protection cover (31) arranged outside the noses (12) and necks (13) of the respective tightening means (9).

8. Apparatus according to claim 1, in which the corresponding conical surface (15) of the house (3) in non-rigid in the Z-direction.

9. Apparatus according to claim 8, in which the house (3) carries a plunger (8) movable in the Z-direction and each of the respective tightening means (9) has a shaft (11) extending from the nose (12) and the neck (13), each said shaft at its end being pivotally journalled to the plunger (8) around a corresponding pivoting axis (10).

10. Apparatus according to claim 9, in which each shaft adjacent to the corresponding pivoting axis (10) is provided with a cam (30) and the house (3) has a cam surface (7) with which the cam (30) cooperates in that way that when the plunger (8) and the respective tightening means (9) are moved in one direction in relation to the house (3), each of the tightening means (9) pivots because of the cooperation of the cam (30) and the cam surface (7) and forces its nose (12) into engagement with the clamping surface (20).

11. Apparatus according to claim 10, in which each shaft (11) at the other end of the corresponding pivot axis (10) in relation to the nose (12) and the neck (13) has a projection (14) which, when the plunger (8) and by that the respective tightening means (9) are moved in the other direction in relation to the house (3), engages an extension portion (29) of the house and forces each of the tightening means (9) to pivot the nose (12) out of engagement with the clamping surface (20).

12. Apparatus according to claim 11, in which the plunger (8) is movable in the other direction against the action of a spring means (27).

13. Apparatus according to claim 12, in which the house (3) has a protection cover (31) arranged outside the noses (12) and necks (13) of the respective tightening means (9).

14. Apparatus according to claim 13, in which the house (3) has a protection cover (31) arranged outside the noses (12) and necks (13) of the respective tightening means (9).

* * * * *

UNITED STATES PATENT AND TRADEMARK OFFICE
CERTIFICATE OF CORRECTION

PATENT NO. :   4,833,760
DATED      :   May 30, 1989
INVENTOR(S) :  Erik Sundstrom It is certified that error appears in the above-identified patent and that said Letters Patent is hereby corrected as shown below:

Col. 1, line 24, delete "deice" and substitute therefor --device--.

Col. 2, line 4, after "and" insert --2--.

Col. 2, line 35, delete "19"" and substitute therefor --19'--.

Col. 3, line 23, delete "cam" and substitute therefor --cams--.

Col. 3, line 50, delete "nd" and substitute therefor --and--.

Col. 3, line 57, delete "cooperation" and substitute therefor --cooperating--.

Col. 5, line 14, delete "in" and substitute therefor --is--.

Signed and Sealed this

Twenty-seventh Day of March, 1990

Attest:

JEFFREY M. SAMUELS

*Attesting Officer*    *Acting Commissioner of Patents and Trademarks*